(12) United States Patent
Kawamura et al.

(10) Patent No.: US 10,831,374 B2
(45) Date of Patent: Nov. 10, 2020

(54) MINIMIZING SEEK TIMES IN A HIERARCHICAL STORAGE MANAGEMENT (HSM) SYSTEM

(71) Applicant: International Business Machines Corporation, Armonk, NY (US)

(72) Inventors: Kousei Kawamura, Tokyo (JP); Koichi Masuda, Tokyo (JP); Sosuke Matsui, Machida (JP); Jun Tanaka, Tokyo (JP); Takahiro Tsuda, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 567 days.

(21) Appl. No.: 15/371,057

(22) Filed: Dec. 6, 2016

(65) Prior Publication Data

US 2018/0157413 A1 Jun. 7, 2018

(51) Int. Cl.
*G06F 3/06* (2006.01)
*G06F 12/0802* (2016.01)

(52) U.S. Cl.
CPC ............ *G06F 3/061* (2013.01); *G06F 3/0647* (2013.01); *G06F 3/0686* (2013.01); *G06F 12/0802* (2013.01)

(58) Field of Classification Search
CPC .... G06F 3/0608; G06F 16/119; G06F 16/185; G06F 12/0246; G06F 12/0802; G06F 3/0647
USPC ........................................................ 707/823
See application file for complete search history.

(56) References Cited

U.S. PATENT DOCUMENTS

| | | |
|---|---|---|
| 9,098,433 B1 | 8/2015 | Lazier et al. |
| 9,201,795 B2 | 12/2015 | Gill et al. |
| 2010/0011154 A1* | 1/2010 | Yeh ..................... G06F 12/0246 711/103 |
| 2015/0242136 A1* | 8/2015 | Lin ....................... G06F 3/0649 711/114 |
| 2016/0041758 A1 | 2/2016 | Iwasaki et al. |
| 2016/0110249 A1* | 4/2016 | Orme ................... G06F 11/1016 714/6.24 |
| 2016/0217036 A1* | 7/2016 | Trachy .................... G06F 3/064 |

OTHER PUBLICATIONS

"IBM 3592 Tape Cartridge," Jul. 26, 2016, pp. 1, Retrieved From http://www-03.ibm.com/systems/storage/media/3592/specifications.html.

* cited by examiner

*Primary Examiner* — Marcin R Filipczyk
(74) *Attorney, Agent, or Firm* — Zilka-Kotab, P.C.

(57) ABSTRACT

A computer-implemented method, according to one embodiment, includes assigning one or more first-type tape cartridges to an upper tape layer of a hierarchical storage management system, assigning one or more second-type tape cartridges to a lower tape layer of the hierarchical storage management system, and moving, to the lower tape layer, data having lower access frequency and recorded in the first-type tape cartridge assigned to the upper tape layer. A length of a tape included in the second-type tape cartridge is longer than a length of a tape included in the first-type tape cartridge.

19 Claims, 5 Drawing Sheets

MINIMIZING SEEK TIMES IN A HIERARCHICAL STORAGE MANAGEMENT (HSM) SYSTEM

BACKGROUND

The present invention relates to HSM systems, and more specifically, this invention relates to evaluating access frequencies of data in a HSM system to thereby minimize seek times in the HSM system.

A virtual tape system is a tape management system such as a special storage device or group of devices and software which manages data such that the data appears to be stored entirely on tape cartridges when portions of the data may actually be located in faster, hard disk storage. Programming for a virtual tape system is sometimes referred to as virtual tape server (VTS), although these terms may be used interchangeably, unless otherwise specifically indicated. A virtual tape system may be used with hierarchical storage management (HSM) system in which data is moved as the data falls through various usage thresholds to slower but less costly forms of storage media. A virtual tape system may also be used as part of a storage area network (SAN) where less-frequently used or archived data can be managed by a single virtual tape server for a number of networked computers.

In some virtual tape storage systems, at least one virtual tape server (VTS) is coupled to a tape library comprising numerous tape drives and tape cartridges. The VTS is also coupled to a direct access storage device (DASD), comprised of numerous interconnected hard disk drives.

The DASD may function as a tape volume cache (TVC) of the VTS subsystem. When using a VTS, the host application writes tape data to virtual drives. The volumes written by the host system are physically stored in the tape volume cache (e.g., a RAID disk buffer) and are called virtual volumes. The storage management software within the VTS copies the virtual volumes in the TVC to the physical cartridges owned by the VTS subsystem. Once a virtual volume is copied or migrated from the TVC to tape, the virtual volume is then called a logical volume. As virtual volumes are copied from the TVC to a Magstar cartridge (tape), they are copied on the cartridge end to end, taking up only the space written by the host application. This arrangement maximizes utilization of a cartridge storage capacity.

The storage management software manages the location of the logical volumes on the physical cartridges, and the customer has no control over the location of the data. When a logical volume is copied from a physical cartridge to the TVC, the process is called recall and the volume becomes a virtual volume again. The host cannot distinguish between physical and virtual volumes, or physical and virtual drives. Thus, the host treats the virtual volumes and virtual drives as actual cartridges and drives and all host interaction with tape data in a VTS subsystem is through virtual volumes and virtual tape drives.

SUMMARY

A computer-implemented method, according to one embodiment, includes assigning one or more first-type tape cartridges to an upper tape layer of a hierarchical storage management system, assigning one or more second-type tape cartridges to a lower tape layer of the hierarchical storage management system, and moving, to the lower tape layer, data having lower access frequency and recorded in the first-type tape cartridge assigned to the upper tape layer. A length of a tape included in the second-type tape cartridge is longer than a length of a tape included in the first-type tape cartridge.

A computer program product for reducing seek time in a hierarchical storage management system, according to another embodiment, includes a computer readable storage medium having program instructions embodied therewith. The computer readable storage medium is not a transitory signal per se. The program instructions are readable and/or executable by a computer to cause the computer to perform a method including: assigning, by the computer, one or more first-type tape cartridges to an upper tape layer of a hierarchical storage management system, assigning, by the computer, one or more second-type tape cartridges to a lower tape layer of the hierarchical storage management system, and moving, by the computer, to the lower tape layer, data having lower access frequency and recorded in the first-type tape cartridge assigned to the upper tape layer. A length of a tape included in the second-type tape cartridge is longer than a length of a tape included in the first-type tape cartridge.

A system, according to another embodiment, includes a processor, and logic integrated with the processor, executable by the processor, or integrated with and executable by the processor. The logic is configured to assign one or more first-type tape cartridges to an upper tape layer of a hierarchical storage management system, assign one or more second-type tape cartridges to a lower tape layer of the hierarchical storage management system, and move, to the lower tape layer, data having lower access frequency and recorded in the first-type tape cartridge assigned to the upper tape layer. A length of a tape included in the second-type tape cartridge is longer than a length of a tape included in the first-type tape cartridge.

Other aspects and embodiments of the present invention will become apparent from the following detailed description, which, when taken in conjunction with the drawings, illustrate by way of example the principles of the invention.

DETAILED DESCRIPTION

Figure 1:
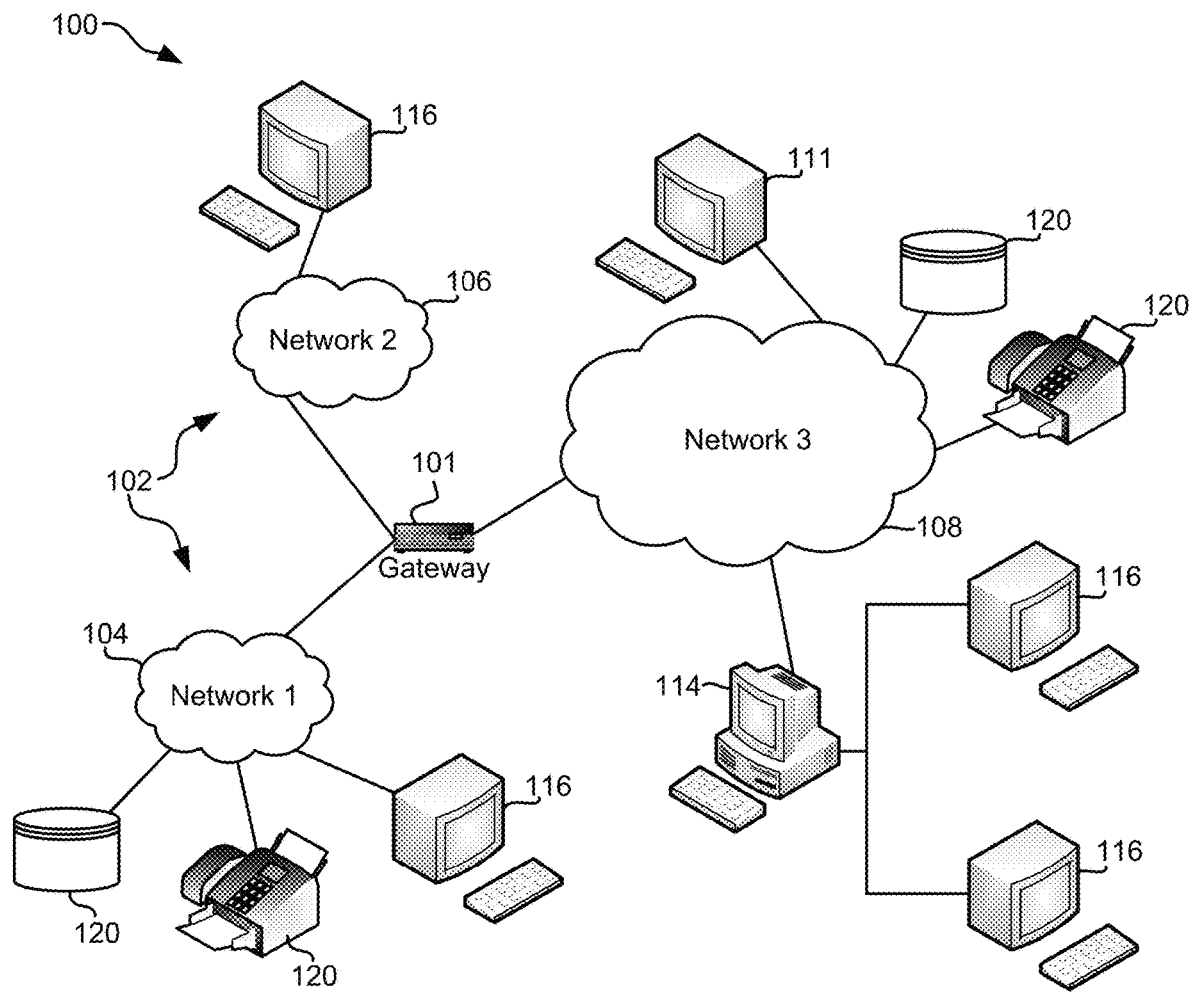
FIG. 1 illustrates a network architecture, in accordance with one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods and computer program products for minimizing seek times in a HSM system.

In one general embodiment, a computer-implemented method includes assigning one or more first-type tape cartridges to an upper tape layer of a hierarchical storage management system, assigning one or more second-type tape cartridges to a lower tape layer of the hierarchical storage management system, and moving, to the lower tape layer, data having lower access frequency and recorded in the first-type tape cartridge assigned to the upper tape layer. A length of a tape included in the second-type tape cartridge is longer than a length of a tape included in the first-type tape cartridge.

In another general embodiment, a computer program product for reducing seek time in a hierarchical storage management system includes a computer readable storage medium having program instructions embodied therewith. The computer readable storage medium is not a transitory signal per se. The program instructions are readable and/or executable by a computer to cause the computer to perform a method including: assigning, by the computer, one or more first-type tape cartridges to an upper tape layer of a hierarchical storage management system, assigning, by the computer, one or more second-type tape cartridges to a lower tape layer of the hierarchical storage management system, and moving, by the computer, to the lower tape layer, data having lower access frequency and recorded in the first-type tape cartridge assigned to the upper tape layer. A length of a tape included in the second-type tape cartridge is longer than a length of a tape included in the first-type tape cartridge.

In yet another general embodiment, a system includes a processor, and logic integrated with the processor, executable by the processor, or integrated with and executable by the processor. The logic is configured to assign one or more first-type tape cartridges to an upper tape layer of a hierarchical storage management system, assign one or more second-type tape cartridges to a lower tape layer of the hierarchical storage management system, and move, to the lower tape layer, data having lower access frequency and recorded in the first-type tape cartridge assigned to the upper tape layer. A length of a tape included in the second-type tape cartridge is longer than a length of a tape included in the first-type tape cartridge.

FIG. 1 illustrates an architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present architecture 100, the networks 104, 106 may each take any form including, but not limited to a LAN, a WAN such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. User devices 116 may also be connected directly through one of the networks 104, 106, 108. Such user devices 116 may include a desktop computer, lap-top computer, hand-held computer, printer or any other type of logic. It should be noted that a user device 111 may also be directly coupled to any of the networks, in one embodiment.

A peripheral 120 or series of peripherals 120, e.g., facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2:
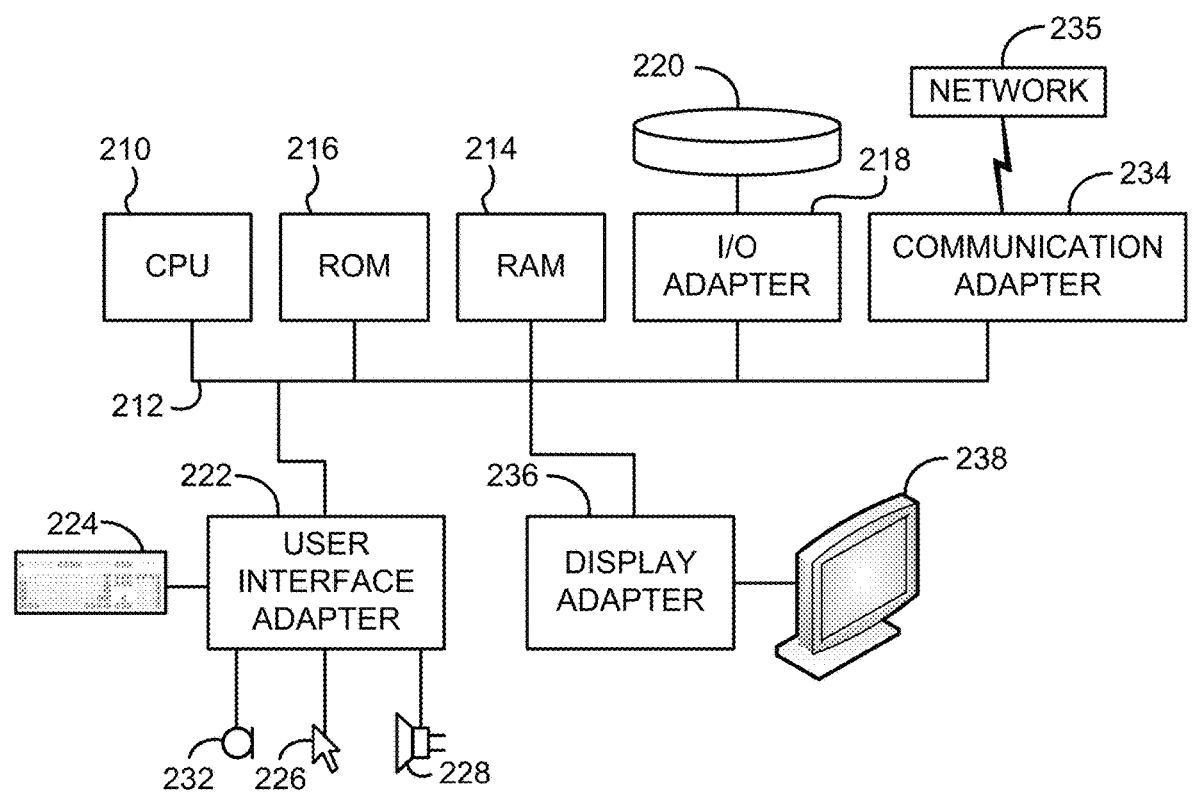
FIG. 2 shows a representative hardware environment that may be associated with the servers and/or clients of FIG. 1, in accordance with one embodiment.

FIG. 2 shows a representative hardware environment associated with a user device 116 and/or server 114 of FIG. 1, in accordance with one embodiment. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows® Operating System (OS), a MAC OS, a UNIX OS, etc. It will be appreciated that a preferred embodiment may also be implemented on platforms and operating systems other than those mentioned. A preferred embodiment may be written using XML, C, and/or C++ language, or other programming languages, along with an object oriented programming methodology. Object oriented programming (OOP), which has become increasingly used to develop complex applications, may be used.

Virtual tape devices and disk storage systems, which incorporate a file system, often support HSM functionality. HSM functionality often features an incorporation of different storage media. An arrangement of the different storage media in such storage systems includes placing frequently accessed data in a medium that is expensive but has relatively faster access speeds. An arrangement of the different storage media may also include, placing less frequently accessed data in an inexpensive medium with relatively slower access speeds. Such data prioritizations may have a goal of achieving efficient management of the storage areas, e.g., relatively faster data seek times. For example, some storage systems are designed as two-stage hierarchical storage systems and include a disk layer and a tape layer, where the more frequently accessed data is located in the disk layer and the less frequently accessed data is located in the tape layer.

As tape cartridge capacities increase with the development of technology, data seek processing for data stored in a physical recording tape, and/or media advancement processing, in which a storage media is advanced to an end portion of the media (both hereafter referred to as "seek processing") may take a long time to perform. For example, assume that the length of a particular tape media may be 1072 meters, and the maximum running speed of the tape in a seek processing operation in a tape drive may be 18 m/s. Assuming that the movement of the tape relative to the head of the tape drive during seek processing takes place from about the beginning of the tape to an intermediate portion of the tape on average, the resulting time to complete the seek processing for the tape media will be about 30 seconds, e.g., 30=1072/2/18. This is a relatively time consuming seek time, during which a user requesting such data must undesirably wait.

Embodiments described herein include reducing seek times of data of a HSM system by storing data in a selected storage layer according to the access frequency of the data.

An illustrative HSM system configured to minimize seek times of data of a storage system by storing data in a determined storage layer according to the access frequency of the data, and corresponding methodology, will now be described.

Figure 3:
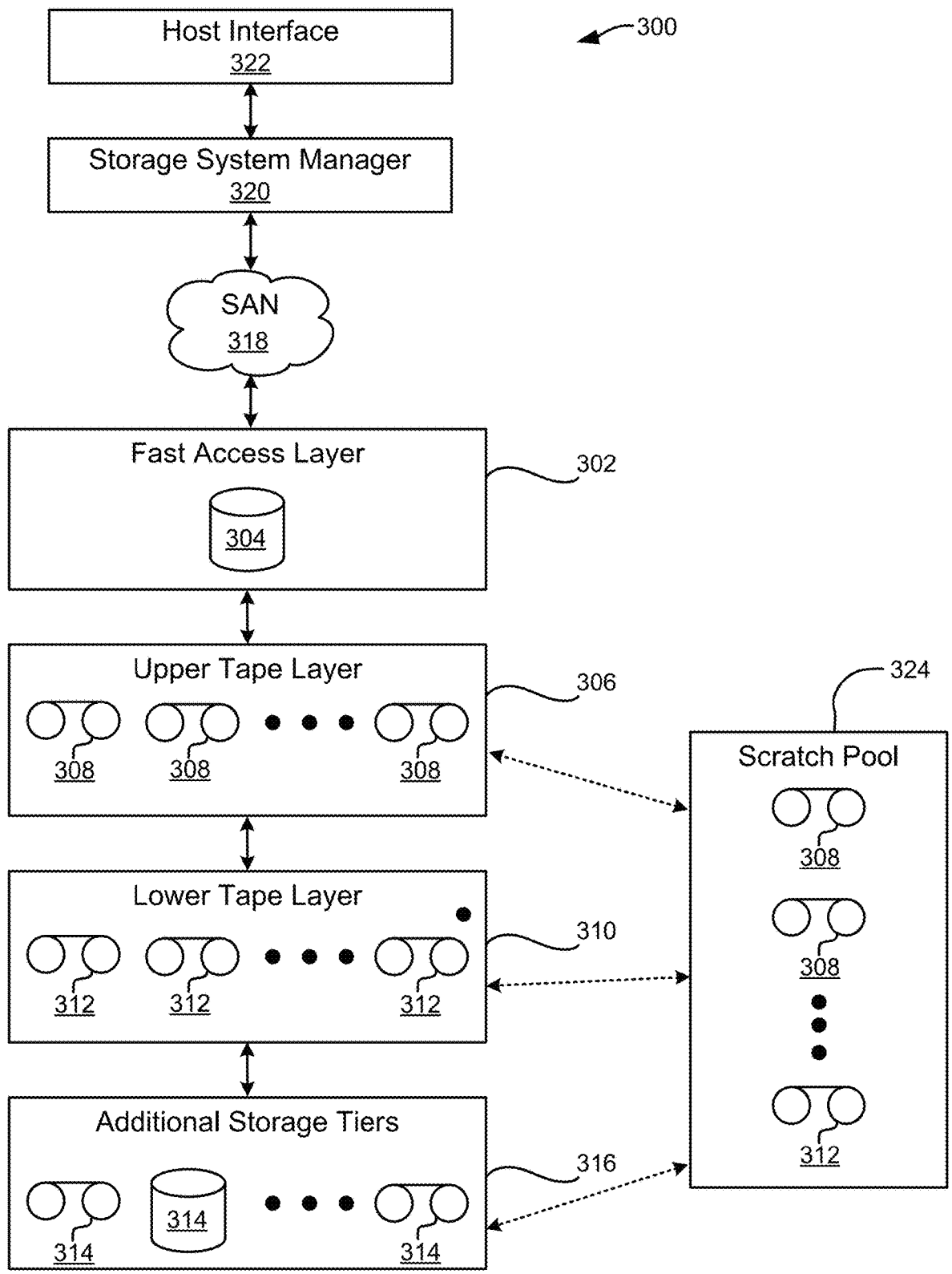
FIG. 3 illustrates a HSM system in accordance with one embodiment.

FIG. 3 depicts a HSM system 300, in accordance with one embodiment. As an option, the present HSM system 300 may be implemented in conjunction with features from any other embodiment listed herein, such as those described with reference to the other FIGS., such as FIGS. 1-2. However, such HSM system 300 and others presented herein may be used in various applications and/or in permutations which may or may not be specifically described in the illustrative embodiments listed herein. Further, the HSM system 300 presented herein may be used in any desired environment. Thus FIG. 3 (and the other FIGS.) may be deemed to include any possible permutation.

Now referring to FIG. 3, an illustrative HSM system 300 is shown according to one embodiment. Note that some of the elements shown in FIG. 3 may be implemented as hardware and/or software, according to various embodiments. The HSM system 300 may include a storage system manager 320 for communicating with a plurality of media and/or drives in the HSM system 300. The HSM system 300 may include a fast access layer 302, which provides relatively faster access to data stored therein than tape layers, e.g., tape layers 306, 310. The fast access layer 302 preferably may include one or more random access and/or direct access media 304, such as hard disks in hard disk drives (HDDs), nonvolatile memory (NVM), solid state memory in solid state drives (SSDs), flash memory, SSD arrays, flash memory arrays, etc., and/or others noted herein and/or known in the art.

The storage system may also include an upper tape layer 306 and a lower tape layer 310. The upper tape layer 306 and/or the lower tape layer 310 may preferably include one or more storage media 308, 312 (respectively). The storage media 308, 312 may include sequential access media such as magnetic tape in tape drives and/or optical media, HDDs, SSDs, etc., and/or other media types noted herein or known in the art. One or more additional storage tiers 316 may include any combination of storage media 314 as desired by a designer of the HSM system 300. Also, the upper tape layer 306 and/or the lower tape layer 310 may include some combination of storage devices and/or storage media.

The storage system manager 320 may communicate with the drives and/or media 304 of the fast access layer 302, the storage media 308 of the upper tape layer 306, the media 312 of the lower tape layer 310, and/or the media 314 of the additional storage tier 316 through a network 318, such as a storage area network (SAN), or some other suitable network type. The storage system manager 320 may also communicate with one or more host systems (not shown) through a host interface 322, which may or may not be a part of the storage system manager 320. The storage system manager 320 may have a controller that is performing HSM on the HSM system 300, as will be described elsewhere herein, e.g., see methods 400, 500 of FIGS. 4 and 5. Referring again to FIG. 3, the storage system manager 320 and/or any other component of the HSM system 300 may be implemented in hardware and/or software, and may make use of a processor (not shown) for executing commands of a type known in the art, such as a central processing unit (CPU), a field programmable gate array (FPGA), an application specific integrated circuit (ASIC), etc. Of course, any arrangement of a storage system may be used, as will be apparent to those of skill in the art upon reading the present description.

In more embodiments, the HSM system 300 may include any number of data storage tiers, and may include the same or different storage memory media within each storage tier. For example, each data storage tier may include the same type of storage memory media, such as HDDs, SSDs, sequential access media (tape in tape drives, optical disk in optical disk drives, etc.), direct access media (CD-ROM, DVD-ROM, etc.), or any combination of media storage types. In one such configuration, a fast access layer 302, may include a majority of SSD storage media for storing data in a higher performing storage environment, and remaining storage tiers, including the upper tape layer 306, the lower tape layer 310, and additional storage tiers 316 may include any combination of SSDs, HDDs, tape drives, etc., for storing data in a lower performing storage environment. In this way, more frequently accessed data, data having a higher priority, data needing to be accessed more quickly, etc., may be stored to the fast access layer 302, while data not having one of these attributes may be stored to another data layer. Of course, one of skill in the art, upon reading the present descriptions, may devise many other combinations of storage media types to implement into different storage schemes, according to the embodiments presented herein.

HSM system 300 may also optionally include a tape group that includes empty or reclaimable storage tapes. The tape group is herein referred to as a 'scratch pool' 324. The scratch pool 324 may be independent of the plurality of media layers, and may provide any of such plurality of media layers with tapes, e.g., in response the media types assigned to such storage layers running out of storage space.

The scratch pool 324 may include any type of storage media. The storage media of the scratch pool 324 may be of any storage capacity.

According to some embodiments, the HSM system 300 may include logic configured to receive a request to open a data set, logic configured to determine if the requested data set is stored to a lower tape layer 310 of the HSM system 300 in multiple associated portions, logic configured to move each associated portion of the requested data set to an upper tape layer 306 of the HSM system 300, and logic configured to assemble the requested data set on the upper tape layer 306 of the HSM system 300 from the associated portions.

Of course, this logic may be implemented as a method on any device and/or system or as a computer program product, according to various embodiments.

Figure 4:
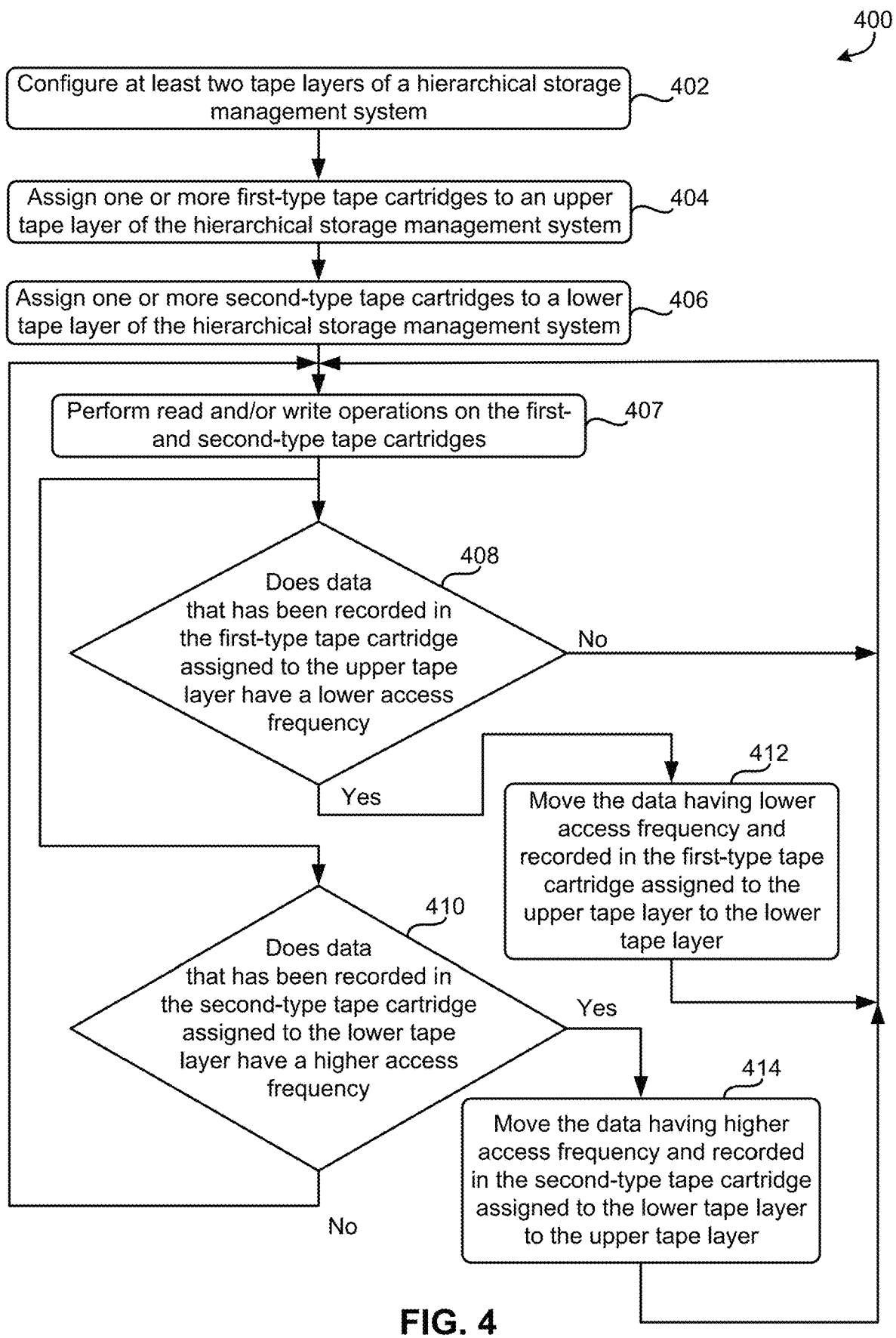
FIG. 4 illustrates a flowchart of a method, in accordance with one embodiment.

FIG. 4 illustrates a flowchart of a method 400 for reducing data seek times in the storage system, according to one embodiment. The method 400 may be performed in accordance with the present invention in any of the environments depicted in FIGS. 1-3, among others, in various embodiments. Of course, more or less operations than those specifically described in FIG. 4 may be included in method 400, as would be understood by one of skill in the art upon reading the present descriptions.

Each of the steps of the method 400 may be performed by any suitable component of the operating environment. For example, in various embodiments, the method 400 may be partially or entirely performed by a computer, or some other device having one or more processors therein. The processor, e.g., processing circuit(s), chip(s), and/or module(s) implemented in hardware and/or software, and preferably having at least one hardware component may be utilized in any device to perform one or more steps of the method 400. Illustrative processors include, but are not limited to, a central processing unit (CPU), an application specific integrated circuit (ASIC), a field programmable gate array (FPGA), etc., combinations thereof, or any other suitable computing device known in the art. In one approach, the method may be performed, e.g., by a controller, in a storage system such as the HSM system 300, Although method 400 is described to be capable of being performed on a computer, it should be noted that method 400 may be performed by the drive controller, a library controller, a storage controller, a host, etc., any of which may be considered to be a computer.

It should be noted that method 400 may be performed in response to any condition being met, and/or request being received. According to one embodiment, method 400 may be performed in response to data being written to the upper tape layer. According to one approach, method 400 may be performed in response to data being written to the upper tape layer from the fast access layer of the HSM system. According to another approach, method 400 may be performed in response to data being written to the upper tape layer and/or the lower tape layer from the fast access layer of the HSM system.

Operation 402 of method 400 includes configuring at least two tape layers of a HSM system. The at least two tape layers of the HSM system may include an upper tape layer and a lower tape layer, e.g., such as those illustrated in FIG. 3. Configuring such tape layers of the HSM system may include allocating and/or assigning physical space of the HSM system that is to be occupied by tape cartridges.

Operation 404 of method 400 includes assigning one or more first-type tape cartridges to an upper tape layer of the HSM system (e.g., see HSM system 300).

Operation 406 of method 400 includes assigning one or more second-type tape cartridges to a lower tape layer of the HSM system.

According to various embodiments, a length of a tape included in the second-type tape cartridge may be longer than a length of a tape included in the first-type tape cartridge. The length of the tape included in the second-type tape cartridge may be any length longer than the length of the tape included in the first-type tape cartridge. According to one approach, the length of the tape included in the second-type tape cartridge may be slightly longer than the length of a tape included in the first-type tape cartridge. According to another approach, the length of the tape included in the second-type tape cartridge may be relatively much longer than the length of a tape included in the first-type tape cartridge. Preferably, all of the first-type tape cartridges have tapes that are longer than all of the tapes of the second-type tape cartridge.

Longer tape lengths tend to correspond to longer seek times when accessing the data thereon, because, on average, more tape must be spooled to access the start of data relative to shorter tapes, where the start of data is, on average, closer to the beginning of tape (BOT). The tradeoff is that shorter tapes may have less capacity. Accordingly, the first-type tape cartridges may have relatively shorter tapes to provide lower seek times, while the second-type tape cartridges may have relatively longer tapes to provide higher storage density.

Operation 407 includes performing one or more read and/or write operation(s) on the first- and second-type tape cartridges, where each operation corresponds to an access to the data. Referring again to FIG. 3, data may be received from a host or requested by the host via the host interface 322. The storage system manager 320 may fulfill the request by causing the data to be written, e.g., to the fast access layer 302 and/or upper tape layer 306. Read-requested data is retrieved from whichever layer the data resides in.

The access frequency of the data may change depending on the number of read and/or write operations performed during a predetermined time period. Data having a higher access frequency is preferably located in a layer having faster average access times (relatively shorter seek times). If such data is located in a layer having slower access, it may be moved to a layer having faster access times so that it can be retrieved more quickly. Conversely, data that is not accessed as frequently may be moved to a layer having a relatively slower access time (relatively longer seek times).

Accordingly, data having higher access frequencies is preferably moved to first-type tape cartridges of the upper tape layer, which provide relatively lower average seek times than do cartridges in the lower tape layer. Data with lower access frequencies and recorded in a first-type tape cartridge assigned to the upper tape layer may be moved to a second-type tape cartridge assigned to the lower tape layer (relatively longer seek times).

Decision 408 of method 400 includes determining whether data that has been recorded in a first-type tape cartridge assigned to the upper tape layer has a lower access frequency. According to various embodiments, the access frequency may be based on a number of times data is accessed in a predetermined amount of time. Any criteria known in the art may be used to determine when data should be deemed to have a lower access frequency, and thereby should be migrated to a data level having slower access times.

According to one approach, the data may be deemed to have a lower access frequency based on comparison of the access frequency to a predetermined threshold access frequency or access frequency range. According to another approach, the data may be deemed to have a lower access frequency in response to determining that the data has not been accessed in a predetermined amount of time. According to a further approach, the data may be deemed to have a lower access frequency in response to determining that the last access of data of the upper tape layer is not included in a predetermined number of recent access events. According to yet another approach, the data may be deemed to have a lower access frequency in response to the data having the lowest access frequency of any other data recorded the first-type tape cartridges assigned to the upper tape layer. According to a further approach, data may be deemed to have a lower access frequency based on an access frequency of the data being lower than access frequencies of other data stored in the upper tape layer. According to yet another approach, data may be deemed to have a lower access frequency based on an access frequency of the data being in a range of access frequencies of other data recorded in the lower tape layer.

If data recorded in a first-type tape cartridge assigned to the upper tape layer has a lower access frequency (as illustrated by the 'Yes' logical path leading from decision 408), such data may be moved to the lower tape layer, e.g., see operation 412.

As noted by the two logical paths leading from operation 407, the access frequency of data recorded in the second-type tape cartridge assigned to the lower tape layer may also and/or alternatively be considered during performance of method 400, and a determination may be made whether moving data in the lower tape layer would potentially reduce seek times, e.g., see decision 410.

Decision 410 of method 400 includes determining whether data that has been recorded in a second-type tape cartridge assigned to the lower tape layer has a higher access frequency. Again, according to various embodiments, the access frequency may be based on a number of times data is accessed in a predetermined amount of time. Any criteria known in the art may be used to determine when data should be deemed to have a lower access frequency, and thereby should be migrated to a data level having slower access times.

According to one approach, the data may be deemed to have a higher access frequency based on comparison of the access frequency to a predetermined threshold access frequency or access frequency range. According to another approach, the data may be deemed to have a higher access frequency in response to determining that the data has been accessed within a predetermined amount of time. According to another approach, the data may be deemed to have a higher access frequency in response to determining that the data has been accessed at least a certain number of times within a predetermined amount of time. According to a further approach, the data may be deemed to have a higher access frequency in response to determining that the last access of data of the upper tape layer is included in a predetermined number of recent access events. According to yet another approach, the data may be deemed to have a higher access frequency in response to the data having the highest access frequency of any other data recorded the second-type tape cartridges assigned to the second tape layer. According to a further approach, data may be deemed to have a higher access frequency based on an access frequency of the data being higher than access frequencies of data stored in the lower tape layer. According to yet another approach, data may be deemed to have a higher access frequency based on an access frequency of the data being in a range of access frequencies of other data recorded in the upper tape layer.

If it is determined that data in a second-type tape cartridge assigned to the lower tape layer has a higher access frequency (as illustrated by the 'Yes' logical path leading from decision 410), the data having higher access frequency may be moved to the upper tape layer, e.g., see operation 414. Because the tapes in the first-type tape cartridges in the upper tape layer are shorter than the tapes in the second-type tape cartridges in the lower tape layer, the average seek time for the data in the upper tape layer is significantly less.

In response to determining that data that has been recorded in the first-type tape cartridge assigned to the upper tape layer does not have a lower access frequency (as illustrated by the 'No' logical path leading from decision 408), the data may not be moved. Similarly, in response to determining that data that has been recorded in the second-type tape cartridge assigned to the lower tape layer does not have a higher access frequency (as illustrated by the 'No' logical path leading from decision 410), the data may not be moved. In addition and/or as an alternative to not moving the data, a subsequent read and/or write operation may be performed on the first- and second-type tape cartridges. Performing a subsequent read and/or write operation on the first- and second-type tape cartridges may alter the access frequency of data recorded on the first- and/or second-type tape cartridges. Accordingly, the access frequencies of data recorded on the first- and/or second-type tape cartridges may be again considered to determine if the data should be moved to a different type tape cartridge assigned to a different tape layer.

Figure 5:
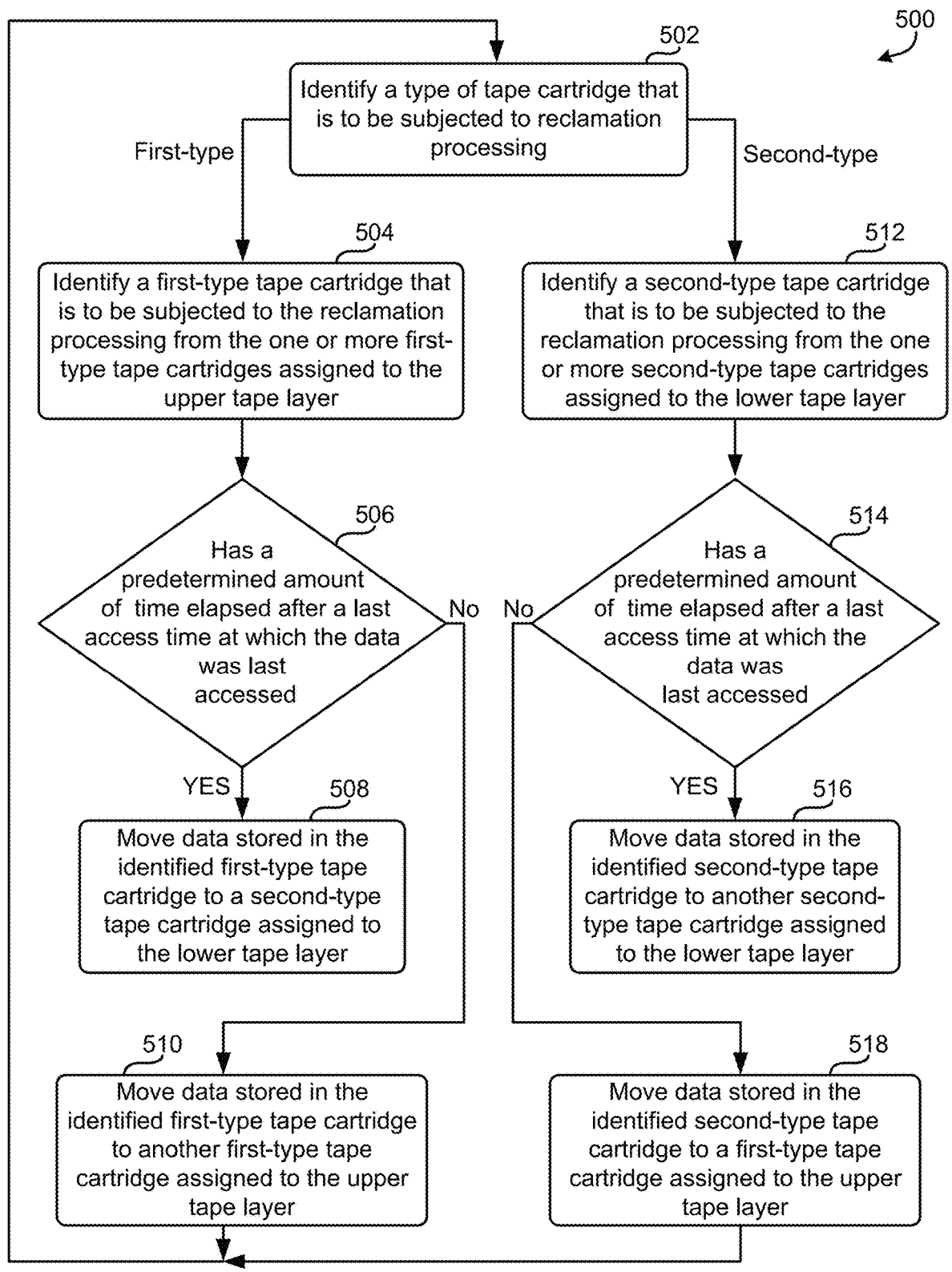
FIG. 5 illustrates a flowchart of a method for reclamation processing, in accordance with one embodiment.

According to various embodiments, moving data from a tape cartridge assigned to one tape layer to a tape cartridge assigned to a different tape layer may be carried out during reclamation processing, e.g., see method 500 of FIG. 5.

Referring now to FIG. 5, a flowchart of a method 500 is shown according to one embodiment. The method 500 may be performed in accordance with the present invention in any of the environments depicted in FIGS. 1-3, among others, in various embodiments. Of course, more or less operations than those specifically described in FIG. 5 may be included in method 500, as would be understood by one of skill in the art upon reading the present descriptions.

Each of the steps of the method 500 may be performed by any suitable component of the operating environment. For example, in various embodiments, the method 500 may be partially or entirely performed by a computer, or some other device having one or more processors therein. The processor, e.g., processing circuit(s), chip(s), and/or module(s) implemented in hardware and/or software, and preferably having at least one hardware component may be utilized in any device to perform one or more steps of the method 500. Illustrative processors include, but are not limited to, a central processing unit (CPU), an application specific integrated circuit (ASIC), a field programmable gate array (FPGA), etc., combinations thereof, or any other suitable computing device known in the art.

In response to moving data from a tape cartridge assigned to one tape layer to a tape cartridge assigned to a different tape layer, it is desirable to reclaim the storage space. However, because tape is typically written by append-only writing methods such as shingled writing, random areas of tape cannot simply be written over. Accordingly, even though the index of the cartridge may reflect an empty area of tape where migrated data used to reside, that area may not be usable until all other data in the associated data band on tape is moved as well.

Reclamation processing may include moving only valid data from one tape to another tape, where erased or data migrated to another cartridge are deemed invalid. Once the valid data has been moved off of the cartridge or data band thereof, that cartridge or data band may be overwritten with new data.

Reclamation processing may be performed in response to any condition being met, and/or request being received. According to a preferred embodiment, reclamation processing may be performed in response to a quantity of valid data on a cartridge falling into a range, such as below a predefined threshold. According to another embodiment, reclamation processing may be performed in response to a ratio of valid to invalid data on the cartridge falling into a range. The ranges may be set by a user, retrieved from a table, set in firmware, etc. In a further embodiment, reclamation processing may be carried out in response to passage of a predetermined amount of time after a last access having been made to the valid data on the tape.

According to another embodiment, the reclamation processing may alternatively and/or additionally be carried out in response to a determination that a proportion of the valid data on the tape, relative to at least one of a total capacity of the tape and an amount of the invalid data, is lower than a predetermined threshold. According to one example, the reclamation processing may be carried out in response to a determination that the proportion of the valid data on the tape relative to the total capacity of the tape is less than a predetermined amount, such as 50%. According to another example, the reclamation processing may be carried out in response to a determination that the proportion of the valid data on the tape relative to the amount of invalid data on the tape is less than a predetermined amount, such as 10%. According to yet another example, the reclamation processing may be carried out in response to a determination that the proportion of the valid data on the tape relative to the total capacity of the tape is less than a predetermined amount, such as 50%, and the proportion of the valid data on the tape relative to the amount of invalid data on the tape is less than another predetermined amount, such as 33%. These amounts may be determined via any suitable technique, such as retrieved from a table, set by a user, etc.

Operation 502 of method 500 includes identify a type of tape cartridge that is to be subjected to reclamation processing. The type of tape cartridge that is to be subjected to reclamation processing may be identified by any one or more processes. According to one approach the type of tape cartridge that is to be subjected to the reclamation processing may be identified based on a received input, e.g., from a user, from a queue, from a controller of a device that is performing method 400 and/or method 500, etc. According to another approach, the type of tape cartridge that is to be subjected to the reclamation processing may be identified as a type of tape cartridge that was not the type of tape cartridge of the most recent reclamation processing event, e.g., thereby alternating the type of tape cartridge in each performance of method 500. According to yet another approach, the type of tape cartridge that is to be subjected to the reclamation processing may be identified to be the type of tape cartridge that is most abundant in the storage system.

In response to the type of tape cartridge being identified as a first-type tape cartridge (as illustrated by the 'First-type' logical path leading from operation 502), a particular first-type tape cartridge may be identified for the reclamation processing, e.g., see operation 504.

Operation 504 of method 500 includes identifying a first-type tape cartridge that is to be subjected to the reclamation processing from the one or more first-type tape cartridges assigned to the upper tape layer. The first-type tape cartridge that is to be subjected to the reclamation processing may be identified using any desired selection process that would become apparent to one skilled in the art upon reading the present description. According to one approach, the first-type tape cartridge that is to be subjected to the reclamation processing may be identified by a controller that accesses a scheduling queue. According to another approach, the first-type tape cartridge that is to be subjected to the reclamation processing may be identified by a processor of a device that is performing method 400 and/or method 500, as being a one of a plurality of first-type tape cartridges that contains invalid data. According to yet another approach, the first-type tape cartridge that is to be subjected to the reclamation processing may be identified based on an amount of data remaining on the tape, such as where only some percentage of the storage capacity has valid data.

Decision 506 of method 500 includes determining whether a predetermined amount of time has elapsed after a last access time at which the data was last accessed.

Determining whether or not a predetermined amount of time has elapsed after a last access time of the data in the upper tape layer may be used to determine whether the data to be reclaimed should be moved to another tape in the upper tape layer to maintain faster data seek times, or moved to a second-type tape cartridge in a lower tape layer. A predetermined amount of time having elapsed after a last access time of the data may correspond to data with an infrequent access frequency (which may also be known as "cold data").

According to various embodiments, the predetermined amount of time that has elapsed after a last access time at which the data was last accessed may be any amount of time, and moreover may vary depending upon the embodiment. According to one approach, the predetermined amount of time may be a predetermined number of seconds and/or fractions of a second. According to another approach, the predetermined amount of time may be a predetermined number of minutes and/or hours. According to yet another approach, the predetermined amount of time may be a predetermined number of days.

In response to determining that the predetermined amount of time has elapsed after a last access time at which the data was last accessed (as illustrated by the 'YES' logical path leading from decision 506), data stored in the identified first-type tape cartridge may be moved to the second-type tape cartridge assigned to the lower tape layer, e.g., see operation 508.

According to one embodiment, moving data stored in the identified first-type tape cartridge to the second-type tape cartridge assigned to the lower tape layer may include moving the data stored in the identified first-type tape cartridge to a location on a second-type tape cartridge assigned to the lower tape layer that is available and has capacity to receive the data.

According to another embodiment, in response to the data stored in the identified first-type tape cartridge to be moved to the second-type tape cartridge assigned to the lower tape layer, where each of the second-type tape cartridges are full of data, a scratch pool may provide an empty tape cartridge to be assigned to the lower tape layer. The data that is to be moved may be moved to the provided tape cartridge.

Referring again to decision 506 of method 500, in response to determining that a predetermined amount of time has not elapsed after the last access time at which the data was last accessed (as illustrated by the 'No' logical path leading from decision 506), data stored in the identified tape cartridge may be moved to another first-type tape cartridge assigned to the upper tape layer, e.g., see operation 510. According to various embodiments, data stored in the identified first-type tape cartridge may be moved to another first-type tape cartridge assigned to the upper tape layer for purposes of consolidating data of the upper tape layer.

Referring again to operation 502, in response to the type of tape cartridge being identified as a second-type tape cartridge (as illustrated by the 'Second-type' logical path leading from operation 502), a particular second-type tape cartridge may be identified for the reclamation processing, e.g., see operation 512. The operations associated the second-type tape cartridge may be similar to those used for the first-type tape cartridge.

Operation 512 includes identifying a second-type tape cartridge that is to be subjected to the reclamation processing from the one or more second-type tape cartridges assigned to the lower tape layer.

Decision 514 of method 500 includes determining whether a predetermined amount of time has elapsed after a last access time at which the data was last accessed.

In response to determining that a predetermined amount of time has elapsed after a last access time at which the data was last accessed (as illustrated by the 'Yes' logical path leading from decision 514) the data stored in the identified second-type tape cartridge may be moved to another second-type tape cartridge assigned to the lower tape layer, e.g., see operation 516.

In response to determining that a predetermined amount of time has not elapsed after a last access time at which the data was last accessed (as illustrated by the 'No' logical path leading from decision 514) the data stored in the identified second-type tape cartridge may be moved to the first-type tape cartridge assigned to the upper tape layer, e.g., see operation 518.

It should be noted that in response to moving data from one location to another location in the data storage system, an access frequency timer for each group of data may be reset, e.g., to track the time elapsed between a subsequent access event.

To provide an illustrative example of how storing data according to access frequencies in an HSM system may minimize data seek times, assume for example that a tape has an illustrative length of 281 meters. Assuming that an illustrative tape drive has a maximum running speed while in a seek processing operation of the tape of about 18 meters/second. The time for seek processing of the tape may be about 7.8 seconds, e.g., 7.8=281/2/18, where the 7.8 second seek time is obtained by dividing the tape length (281 meters) in half, e.g., assuming that half the tape is traversed during the seek operation, and then dividing the result by the drive's maximum running speed (18 m/s). The data seek processing time in the current example is reduced by about 74%, in response to data with a high access frequency being stored in a first-type tape cartridge (with a relatively shorter 281 meter length) assigned to the upper tape layer as opposed to being stored in a relatively longer second-type tape cartridge assigned to the lower tape layer. Using the data seek processing time calculated in another example herein is 30 seconds, the 74% reduction may be calculated by (30−7.8)/30.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer-implemented method, comprising:
    allocating physical space of an upper tape layer and a lower tape layer of a hierarchical storage management system;
    assigning a plurality of first-type tape cartridges to the allocated physical space of the upper tape layer of the hierarchical storage management system;
    assigning a plurality of second-type tape cartridges to the allocated physical space of the lower tape layer of the hierarchical storage management system,
    wherein a length of each of the tapes included in the plurality of second-type tape cartridges is longer than a length of each of the tapes included in the plurality of first-type tape cartridges;
    defining a copy of data currently stored on a tape included in the plurality of first-type tape cartridges and that has been migrated therefrom to another tape cartridge as invalid;
    defining a copy of data currently stored on a tape included in the plurality of first-type tape cartridges and that has not been migrated therefrom to another tape cartridge as valid;
    determining whether a first predetermined condition for performing reclamation processing is met, wherein the first predetermined condition includes a proportion of valid data on a first tape included in the plurality of first-type tape cartridges, relative to a total capacity of the first tape and/or an amount of invalid data on the first tape, being lower than a predetermined threshold; and
    in response to a determination that the first predetermined condition for performing reclamation processing is met for the first tape, performing reclamation processing on the first tape, wherein performing reclamation processing on the first tape includes:
        making a data band of the first tape available to be entirely overwritten, the data band of the first tape having valid data and invalid data, wherein making the data band of the first tape available to be entirely overwritten includes moving, to the lower tape layer, only valid data having lower access frequency and recorded in the data band of the first tape, and performing overwriting of all data in the data band of the first tape.

2. The computer-implemented method of claim 1, wherein a second predetermined condition for performing the reclamation processing includes passage of a predetermined amount of time after a last access having been made to the valid data on the first tape.

3. The computer-implemented method of claim 1, wherein the hierarchical storage management system includes a scratch pool of tape cartridges containing no data stored thereon, wherein the tape cartridges included in the scratch pool are independent from the other layers of the hierarchical storage management system, and comprising:

in response to a determination that the plurality of second-type tape cartridges assigned to the lower tape layer are running out of storage space, assigning at least some of the tape cartridges of the scratch pool to the lower tape layer.

4. The computer-implemented method of claim 1, comprising:

determining whether a second predetermined condition for performing reclamation processing is met, wherein the second predetermined condition includes passage of a predetermined amount of time after a last access having been made to valid data stored on a data band of a second tape included in the plurality of first-type tape cartridges, wherein the data band of the second tape includes valid data and invalid data; and in response to a determination that the second predetermined condition for performing reclamation processing is met for the second tape, performing reclamation processing on the second tape, wherein performing reclamation processing on the second tape includes:

making the data band of the second tape available to be entirely overwritten, wherein making the data band of the second tape available to be entirely overwritten includes moving, to the lower tape layer, the valid data stored on the data band of the second tape in response to a determination that the predetermined amount of time has elapsed after the last access time at which the valid data stored on the data band of the second tape was last accessed, and moving, to another first-type tape cartridge assigned to the upper tape layer, the valid data stored on the data band of the second tape in response to a determination that the predetermined amount of time has not elapsed after the last access time at which the valid data stored on the data band of the second tape was last accessed, and performing overwriting of all data in the data band of the second tape.

5. The computer-implemented method of claim 4, comprising:

determining whether a third predetermined condition for performing reclamation processing is met, wherein the third predetermined condition includes passage of the predetermined amount of time after a last access having been made to valid data stored on a data band of a third tape included in the plurality of second-type tape cartridges, wherein the data band of the third tape includes valid data and invalid data; and in response to a determination that the third predetermined condition for performing reclamation processing is met for the third tape, performing reclamation processing on the third tape, wherein performing reclamation processing on the third tape includes:

making the data band of the third tape available to be entirely overwritten, wherein making the data band of the third tape available to be entirely overwritten includes moving, to the upper tape layer, the valid data stored on the data band of the third tape in response to a determination that the predetermined amount of time has elapsed after the last access time at which the valid data stored on the data band of the third tape was last accessed, and moving, to another second-type tape cartridge assigned to the lower tape layer, the valid data stored on the data band of the third tape in response to a determination that the predetermined amount of time has not elapsed after the last access time at which the valid data stored on the data band of the third tape was last accessed, and performing overwriting of all data in the data band of the third tape.

6. The computer-implemented method of claim 1, wherein a second predetermined condition for performing the reclamation processing includes a ratio of an amount of valid data on the first tape to an amount of invalid data on the first tape falling into a predetermined range, and comprising:

retaining, in the upper tape layer, data having lower access frequency and recorded in the first-type tape cartridge assigned to the upper tape layer; and performing a next read and/or write operation on the first-type and second-type tape cartridges.

7. The computer-implemented method of claim 6, wherein the predetermined range is determined using a table.

8. The computer-implemented method of claim 1, comprising:

identifying a type of tape cartridge that is to be subjected to the reclamation processing, wherein the type of tape cartridge that is to be subjected to the reclamation processing is identified from input received from a queue; and performing the reclamation processing on the identified type of tape cartridge.

9. The computer-implemented method of claim 1, comprising:

identifying a type of tape cartridge that is to be subjected to the reclamation processing, wherein the type of tape cartridge that is to be subjected to the reclamation processing is identified as a type of tape cartridge that was not the type of tape cartridge of a most recent reclamation processing event; and performing the reclamation processing on the identified type of tape cartridge.

10. A computer program product for reducing seek time in a hierarchical storage management system, the computer program product comprising a non-transitory computer readable storage medium having program instructions embodied therewith, the program instructions readable and/or executable by a computer to cause the computer to perform a method comprising:

allocating, by the computer, physical space of an upper tape layer and a lower tape layer of the hierarchical storage management system;

assigning, by the computer, a plurality of first-type tape cartridges to the allocated physical space of the upper tape layer of the hierarchical storage management system;

assigning, by the computer, a plurality of second-type tape cartridges to the allocated physical space of the lower tape layer of the hierarchical storage management system, wherein a length of each of the tapes included in the plurality of second-type tape cartridges is longer than a length of each of the tapes included in the plurality of first-type tape cartridges;

defining, by the computer, a copy of data currently stored on a tape included in the plurality of first-type tape cartridges and that has been migrated therefrom to another tape cartridge as invalid;

defining, by the computer, a copy of data currently stored on a tape included in the plurality of first-type tape cartridges and that has not been migrated therefrom to another tape cartridge as valid;

determining, by the computer, whether a first predetermined condition for performing reclamation processing is met, wherein the first predetermined condition includes a proportion of valid data on a first tape included in the plurality of first-type tape cartridges, relative to a total capacity of the first tape and/or an amount of invalid data on the first tape, being lower than a predetermined threshold; and in response to a determination that the first predetermined condition for performing reclamation processing is met for the first tape, performing, by the computer, reclamation processing on the first tape, wherein performing reclamation processing on the first tape includes:

making a data band of the first tape available to be entirely overwritten, the data band of the first tape having valid data and invalid data, wherein making the data band of the first tape available to be entirely overwritten includes moving, to the lower tape layer, only valid data having lower access frequency and recorded in the data band of the first tape, and performing overwriting of all data in the data band of the first tape.

11. The computer program product of claim 10, wherein a second predetermined condition for performing the reclamation processing includes passage of a predetermined amount of time after a last access having been made to the valid data on the first tape.

12. The computer program product of claim 10, wherein the hierarchical storage management system includes a scratch pool of tape cartridges containing no data stored thereon, wherein the tape cartridges included in the scratch pool are independent from the other layers of the hierarchical storage management system, and the program instructions readable and/or executable by the computer to cause the computer to perform the method comprising:

in response to a determination that the plurality of second-type tape cartridges assigned to the lower tape layer are running out of storage space, assigning, by the computer, at least some of the tape cartridges of the scratch pool to the lower tape layer.

13. The computer program product of claim 10, the program instructions readable and/or executable by the computer to cause the computer to perform the method comprising:

determining, by the computer, whether a second predetermined condition for performing reclamation processing is met, wherein the second predetermined condition includes passage of a predetermined amount of time after a last access having been made to valid data stored on a data band of a second tape included in the plurality of first-type tape cartridges, wherein the data band of the second tape includes valid data and invalid data; and in response to a determination that the second predetermined condition for performing reclamation processing is met for the second tape, performing, by the computer, reclamation processing on the second tape, wherein performing reclamation processing on the second tape includes:

making the data band of the second tape available to be entirely overwritten, wherein making the data band of the second tape available to be entirely overwritten includes moving, to the lower tape layer, the valid data stored on the data band of the second tape in response to a determination that the predetermined amount of time has elapsed after the last access time at which the valid data stored on the data band of the second tape was last accessed, and moving, to another first-type tape cartridge assigned to the upper tape layer, the valid data stored on the data band of the second tape in response to a determination that the predetermined amount of time has not elapsed after the last access time at which the valid data stored on the data band of the second tape was last accessed, and performing overwriting of all data in the data band of the second tape.

14. The computer program product of claim 13, comprising program instructions readable and/or executable by the computer to cause the computer to perform the method comprising:

determining, by the computer, whether a third predetermined condition for performing reclamation processing is met, wherein the third predetermined condition includes passage of a predetermined amount of time after a last access having been made to valid data stored on a data band of a third tape included in the plurality of second-type tape cartridges, wherein the data band of the third tape includes valid data and invalid data; and in response to a determination that the third predetermined condition for performing reclamation processing is met for the third tape, performing, by the computer, reclamation processing on the third tape, wherein performing reclamation processing on the third tape includes:

making the data band of the third tape available to be entirely overwritten, wherein making the data band of the third tape available to be entirely overwritten includes moving, to the upper tape layer, the valid data stored on the data band of the third tape in response to a determination that the predetermined amount of time has elapsed after the last access time at which the valid data stored on the data band of the third tape was last accessed, and moving, to another second-type tape cartridge assigned to the lower tape layer, the valid data stored on the data band of the third tape in response to a determination that the predetermined amount of time has not elapsed after the last access time at which the valid data stored on the data band of the third tape was last accessed, and performing overwriting of all data in the data band of the third tape.

15. A system, comprising:

a physical processor;

physical storage memory; and logic integrated with the processor, executable by the processor, or integrated with and executable by the processor, the logic being configured to:

allocate physical space of an upper tape layer and a lower tape layer of a hierarchical storage management system;

assign a plurality of first-type tape cartridges to the allocated physical space of the upper tape layer of the hierarchical storage management system;

assign a plurality of second-type tape cartridges to the allocated physical space of the lower tape layer of the hierarchical storage management system, wherein a physical length of each of the tapes included in the plurality of second-type tape cartridges is longer than a physical length of each of the tapes included in the plurality of first-type tape cartridges;

define a copy of data currently stored on a tape included in the plurality of first-type tape cartridges and that has been migrated therefrom to another tape cartridge as invalid;

define a copy of data currently stored on a tape included in the plurality of first-type tape cartridges and that has not been migrated therefrom to another tape cartridge as valid;

determine whether a first predetermined condition for performing reclamation processing is met, wherein the first predetermined condition includes a proportion of valid data on a first tape included in the plurality of first-type tape cartridges, relative to a total capacity of the first tape and/or an amount of invalid data on the first tape, being lower than a predetermined threshold; and in response to a determination that the first predetermined condition for performing reclamation processing is met for the first tape, perform reclamation processing on the first tape, wherein performing reclamation processing on the first tape includes:

making a data band of the first tape available to be entirely overwritten, the data band of the first tape having valid data and invalid data, wherein making the data band of the first tape available to be entirely overwritten includes moving, to the lower tape layer, only valid data having lower access frequency and recorded in the data band of the first tape, and performing overwriting of all data in the data band of the first tape.

16. The system of claim 15, wherein a second predetermined condition for performing the reclamation processing includes passage of a predetermined amount of time after a last access having been made to the valid data on the first tape.

17. The system of claim 15, wherein the hierarchical storage management system includes a scratch pool of tape cartridges containing no data stored thereon, wherein the tape cartridges included in the scratch pool are independent from the other layers of the hierarchical storage management system, and comprising logic configured to:

in response to a determination that the plurality of second-type tape cartridges assigned to the lower tape layer are running out of storage space, assign at least some of the tape cartridges of the scratch pool to the lower tape layer.

18. The system of claim 15, comprising logic configured to:

determine whether a second predetermined condition for performing reclamation processing is met, wherein the second predetermined condition includes passage of a predetermined amount of time after a last access having been made to valid data stored on a data band of a second tape included in the plurality of first-type tape cartridges, wherein the data band of the second tape includes valid data and invalid data; and in response to a determination that the second predetermined condition for performing reclamation processing is met for the second tape, perform reclamation processing on the second tape, wherein performing reclamation processing on the second tape includes:

making the data band of the second tape available to be entirely overwritten, wherein making the data band of the second tape available to be entirely overwritten includes moving, to the lower tape layer, the valid data stored on the data band of the second tape in response to a determination that the predetermined amount of time has elapsed after the last access time at which the valid data stored on the data band of the second tape was last accessed, and moving, to another first-type tape cartridge assigned to the upper tape layer, the valid data stored on the data band of the second tape in response to a determination that the predetermined amount of time has not elapsed after the last access time at which the valid data stored on the data band of the second tape was last accessed, and performing overwriting of all data in the data band of the second tape.

19. The system of claim 18, comprising logic configured to:

determine whether a third predetermined condition for performing reclamation processing is met, wherein the third predetermined condition includes passage of a predetermined amount of time after a last access having been made to valid data stored on a data band of a third tape included in the plurality of second-type tape cartridges, wherein the data band of the third tape includes valid data and invalid data; and in response to a determination that the third predetermined condition for performing reclamation processing is met for the third tape, perform reclamation processing on the third tape, wherein performing reclamation processing on the third tape includes:

making the data band of the third tape available to be entirely overwritten, wherein making the data band of the third tape available to be entirely overwritten includes moving, to the upper tape layer, the valid data stored on the data band of the third tape in response to a determination that the predetermined amount of time has elapsed after the last access time at which the valid data stored on the data band of the third tape was last accessed, and moving, to another second-type tape cartridge assigned to the lower tape layer, the valid data stored on the data band of the third tape in response to a determination that the predetermined amount of time has not elapsed after the last access time at which the valid data stored on the data band of the third tape was last accessed, and performing overwriting of all data in the data band of the third tape.

* * * * *